Oct. 27, 1931.                C. E. LUCKE                1,828,870
            DOUBLE CIRCUIT FORCED CIRCULATION WATER TUBE BOILER
                        Filed Jan. 3, 1927         13 Sheets-Sheet 1
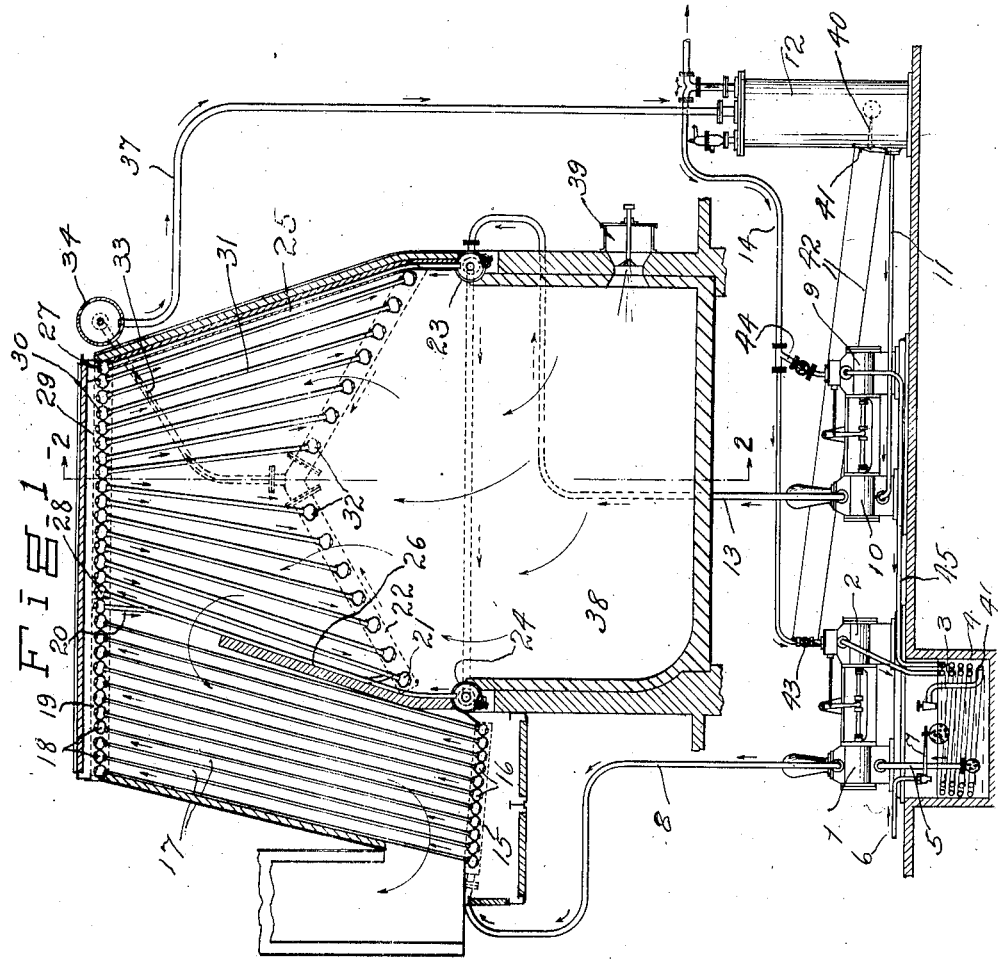
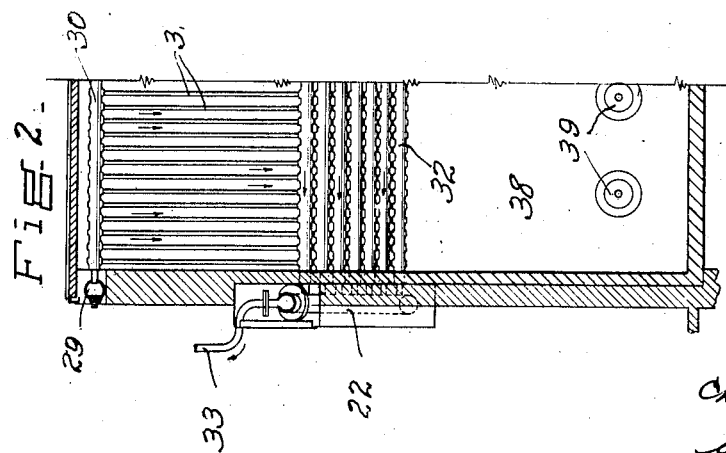
INVENTOR
Charles E. Lucke
BY
ATTORNEYS

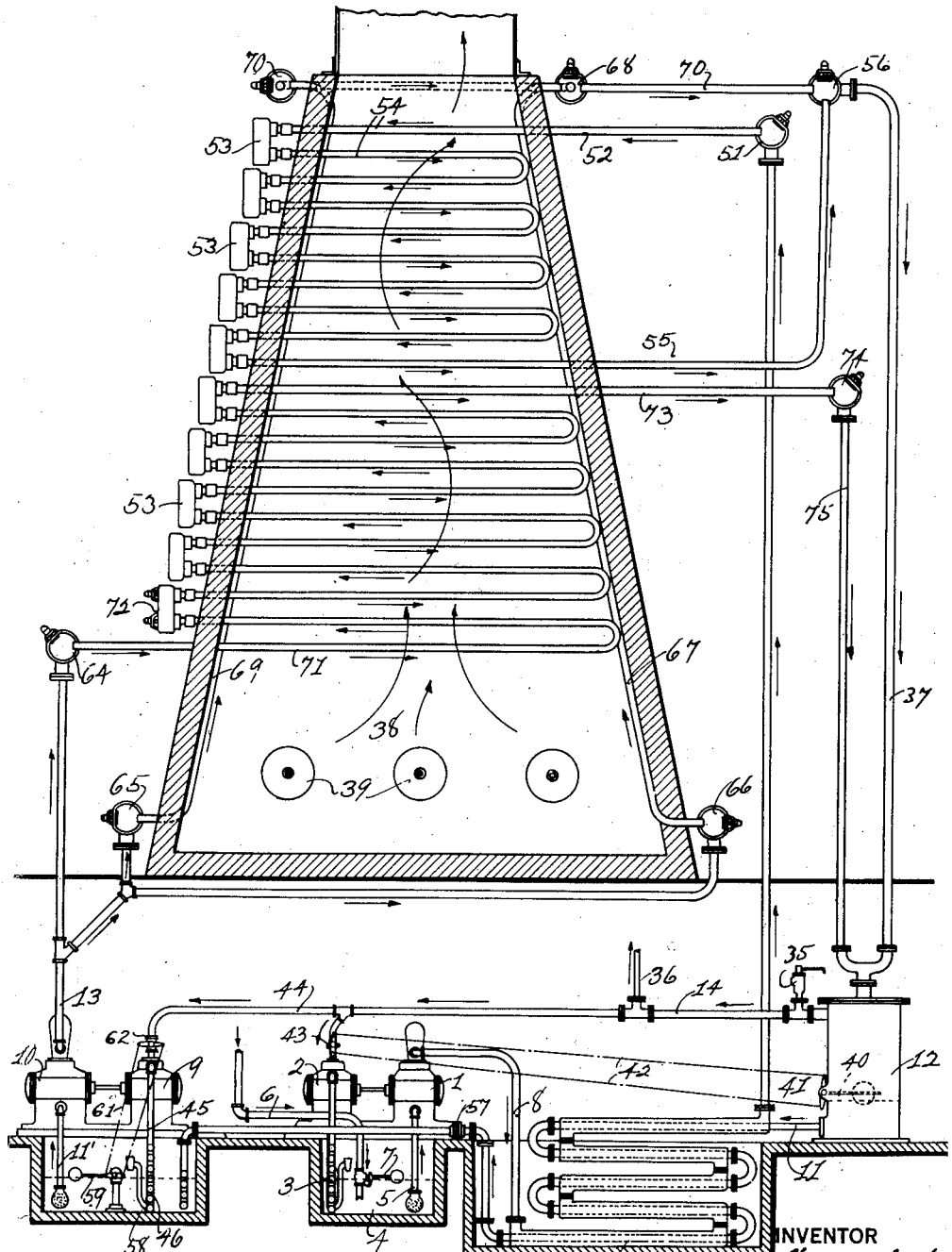

Oct. 27, 1931.     C. E. LUCKE     1,828,870
DOUBLE CIRCUIT FORCED CIRCULATION WATER TUBE BOILER
Filed Jan. 3, 1927     13 Sheets-Sheet 3
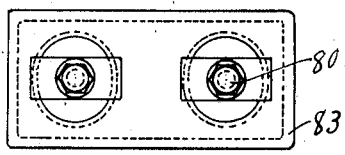
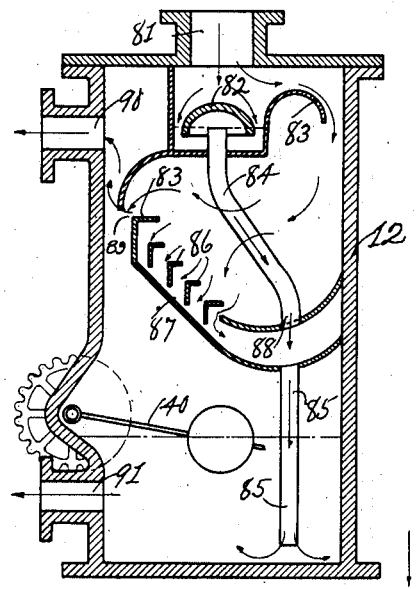
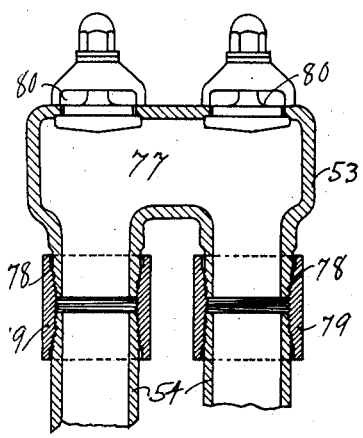
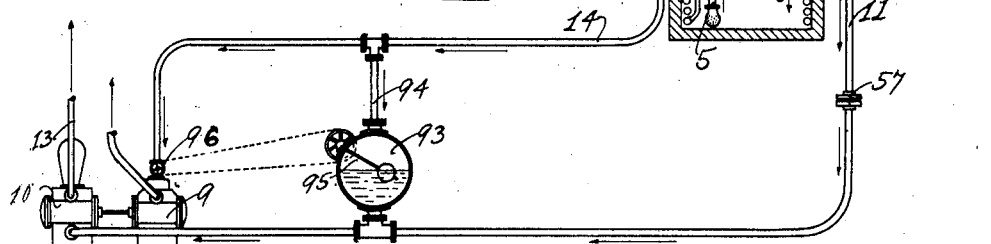
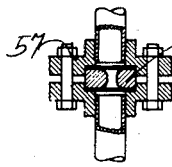
Charles E. Lucke INVENTOR
BY
Gifford & Scull
ATTORNEYS

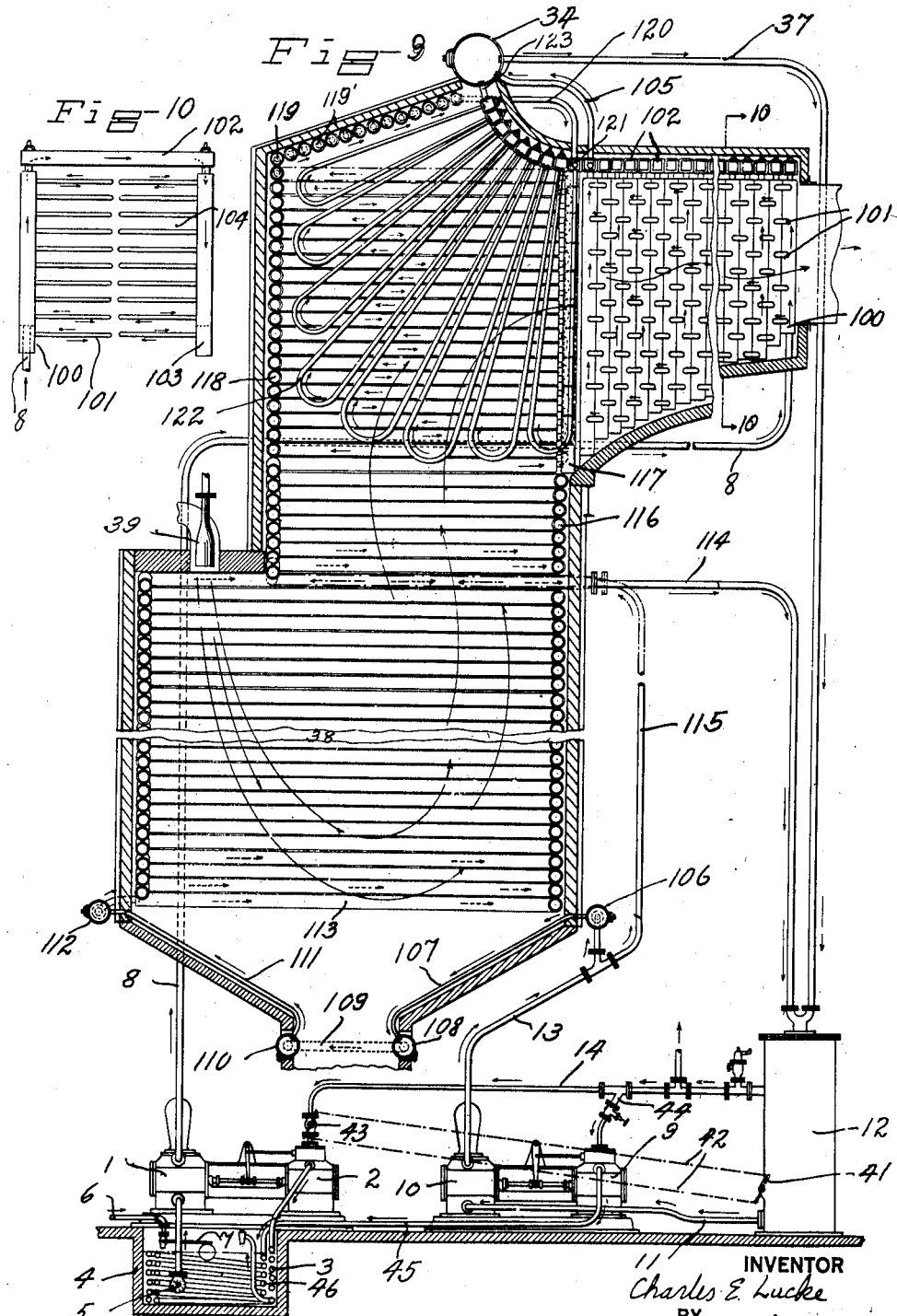

Oct. 27, 1931.   C. E. LUCKE   1,828,870
DOUBLE CIRCUIT FORCED CIRCULATION WATER TUBE BOILER
Filed Jan. 3, 1927   13 Sheets-Sheet 5
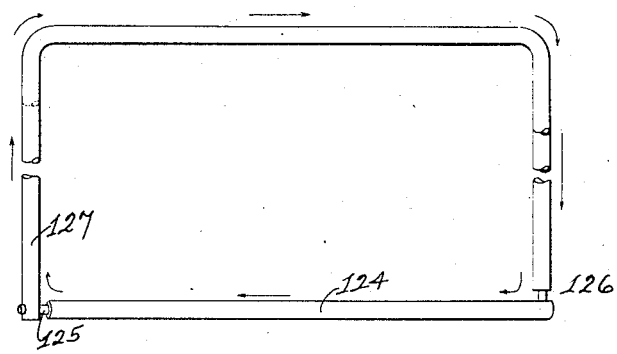
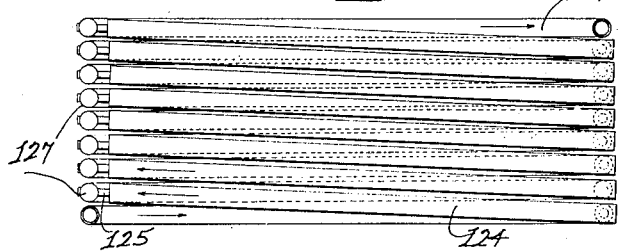
Charles E. Lucke INVENTOR
BY
Gifford & Scull ATTORNEYS

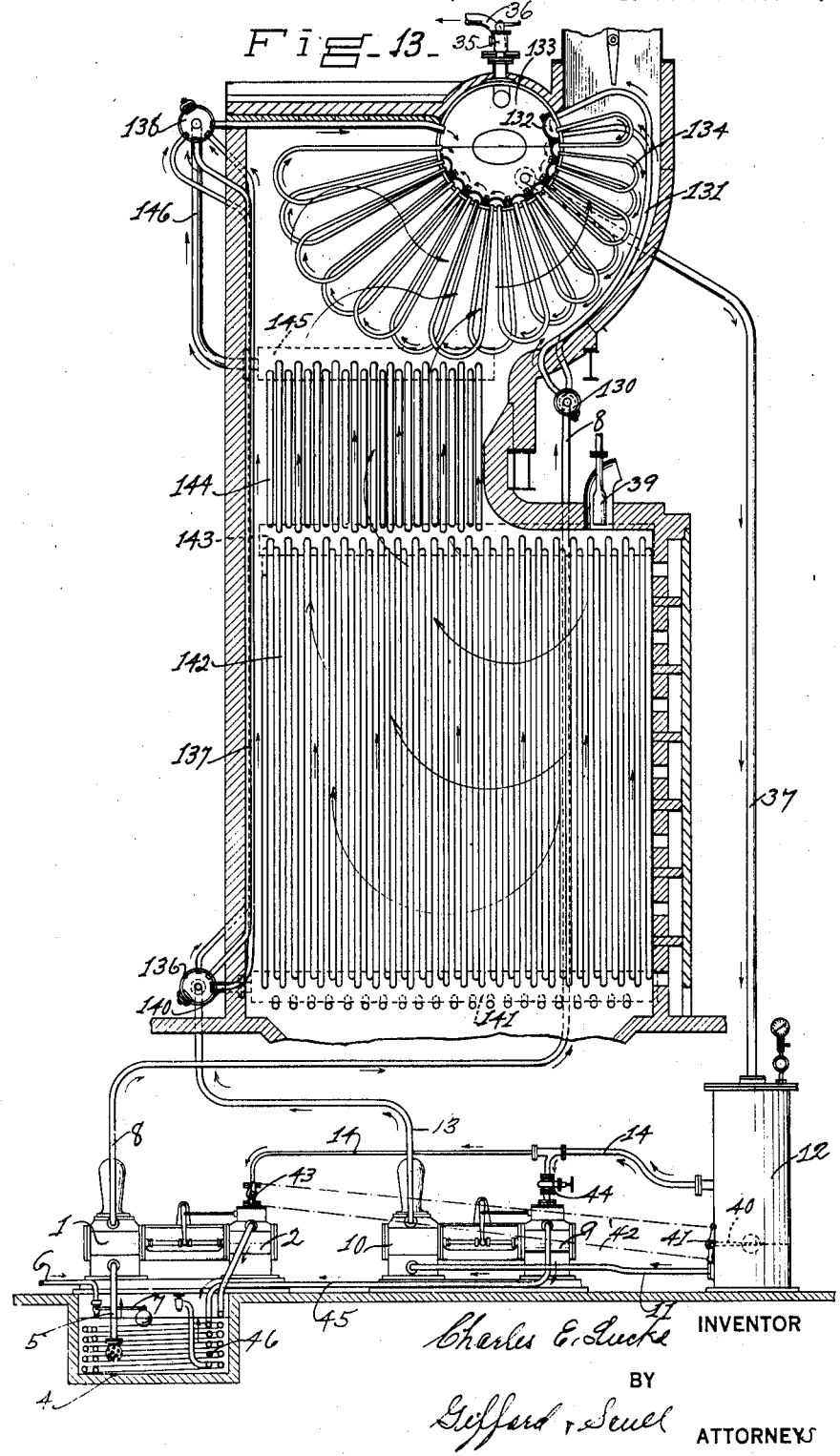

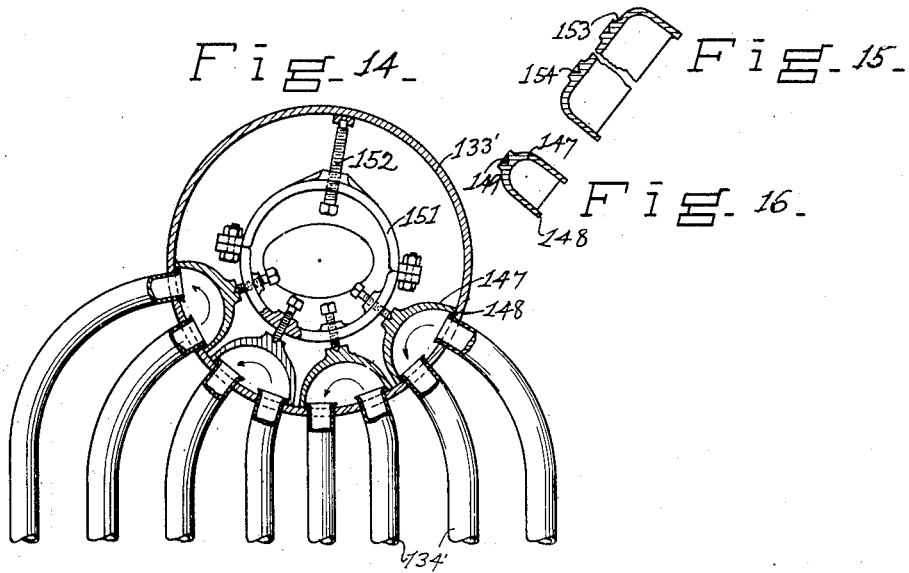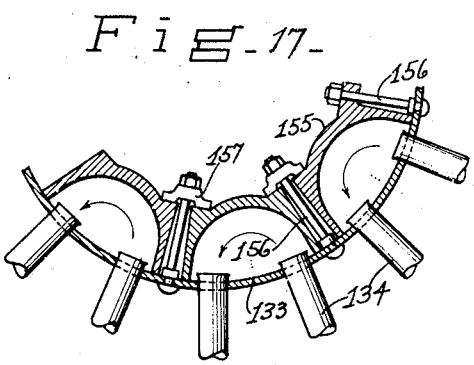

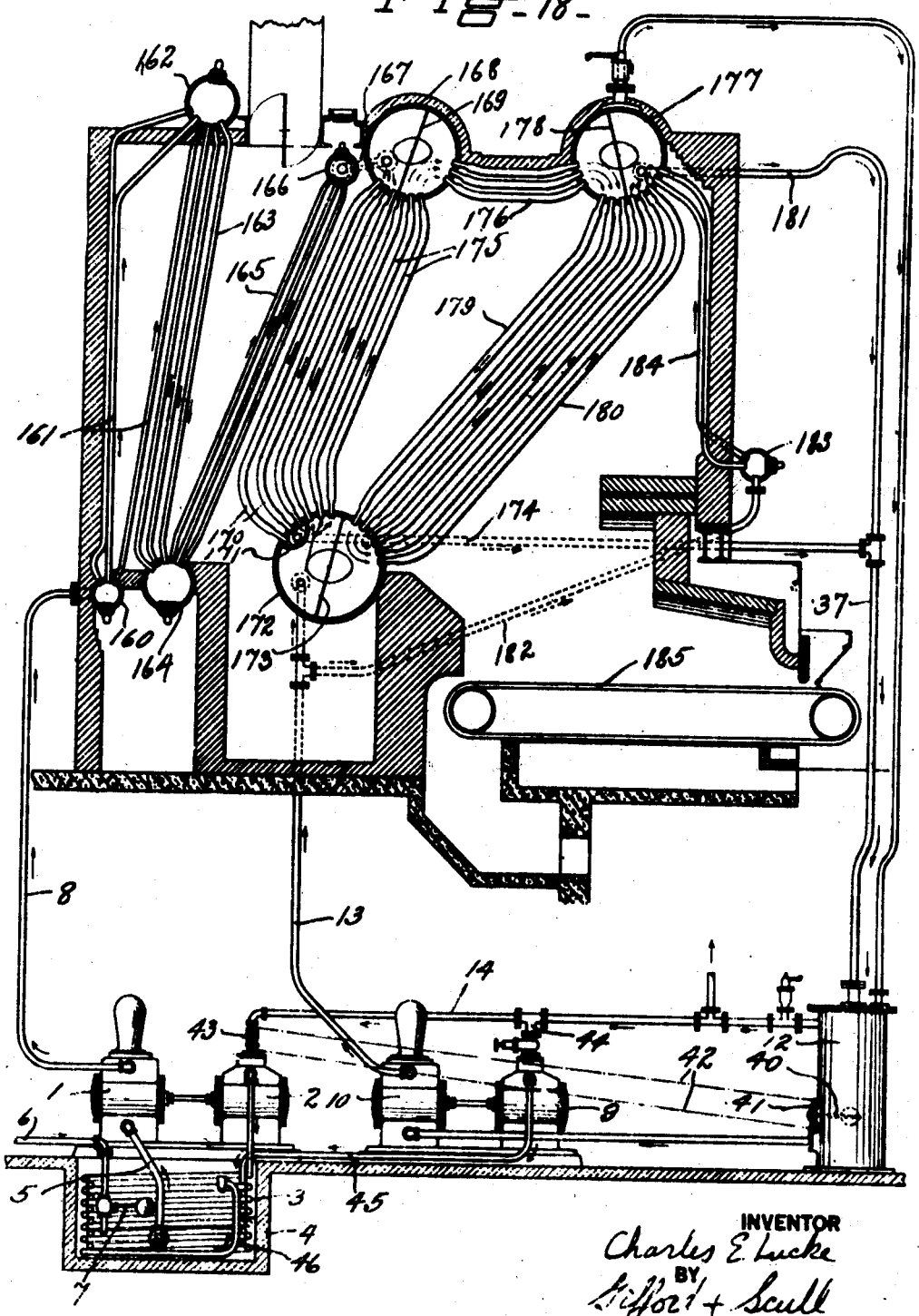

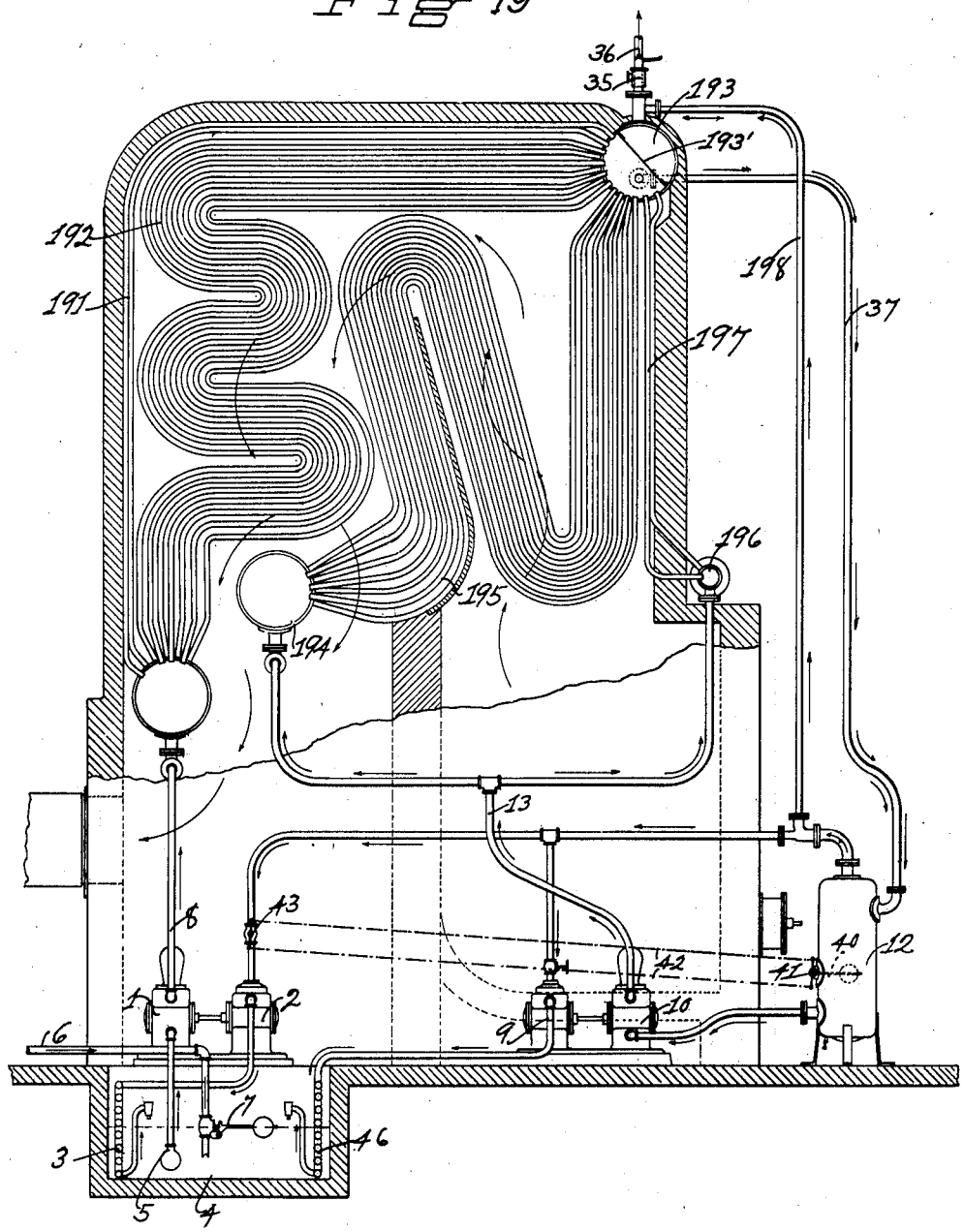

Oct. 27, 1931.  C. E. LUCKE  1,828,870
DOUBLE CIRCUIT FORCED CIRCULATION WATER TUBE BOILER
Filed Jan. 3, 1927    13 Sheets-Sheet 10
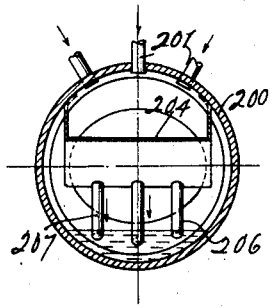
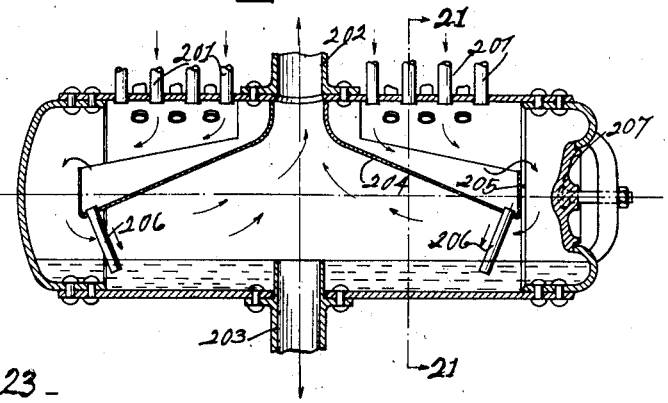
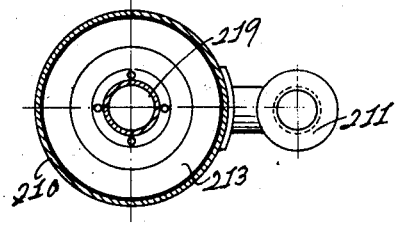
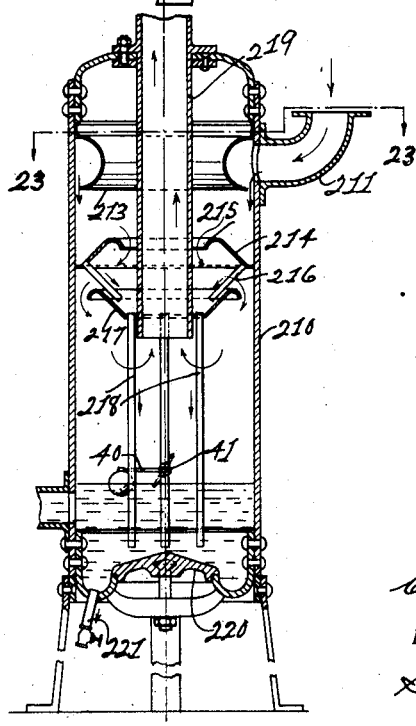
Charles E. Lucke INVENTOR
BY
Gifford + Scull ATTORNEYS

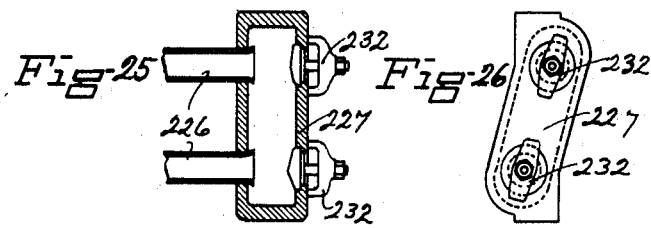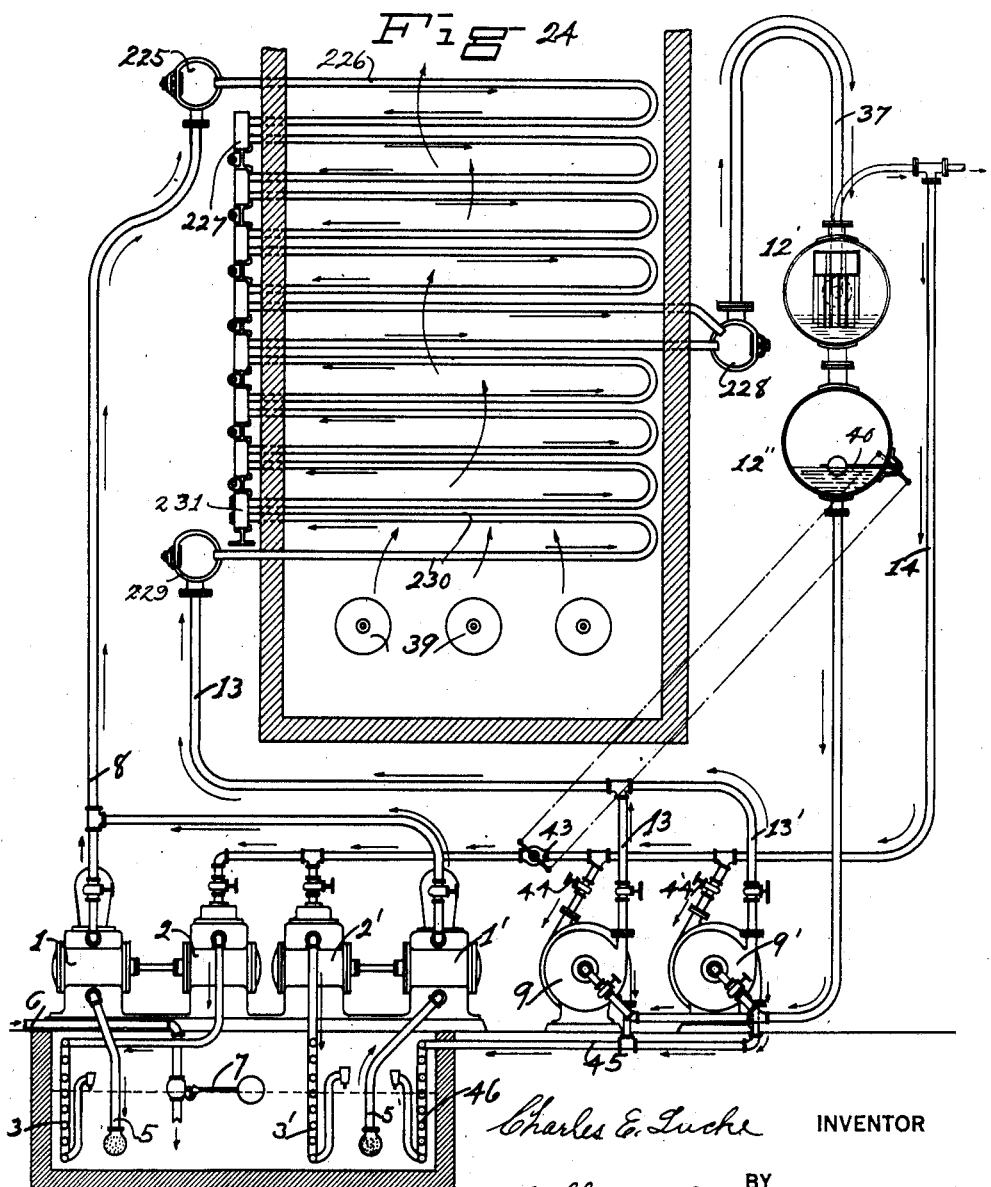

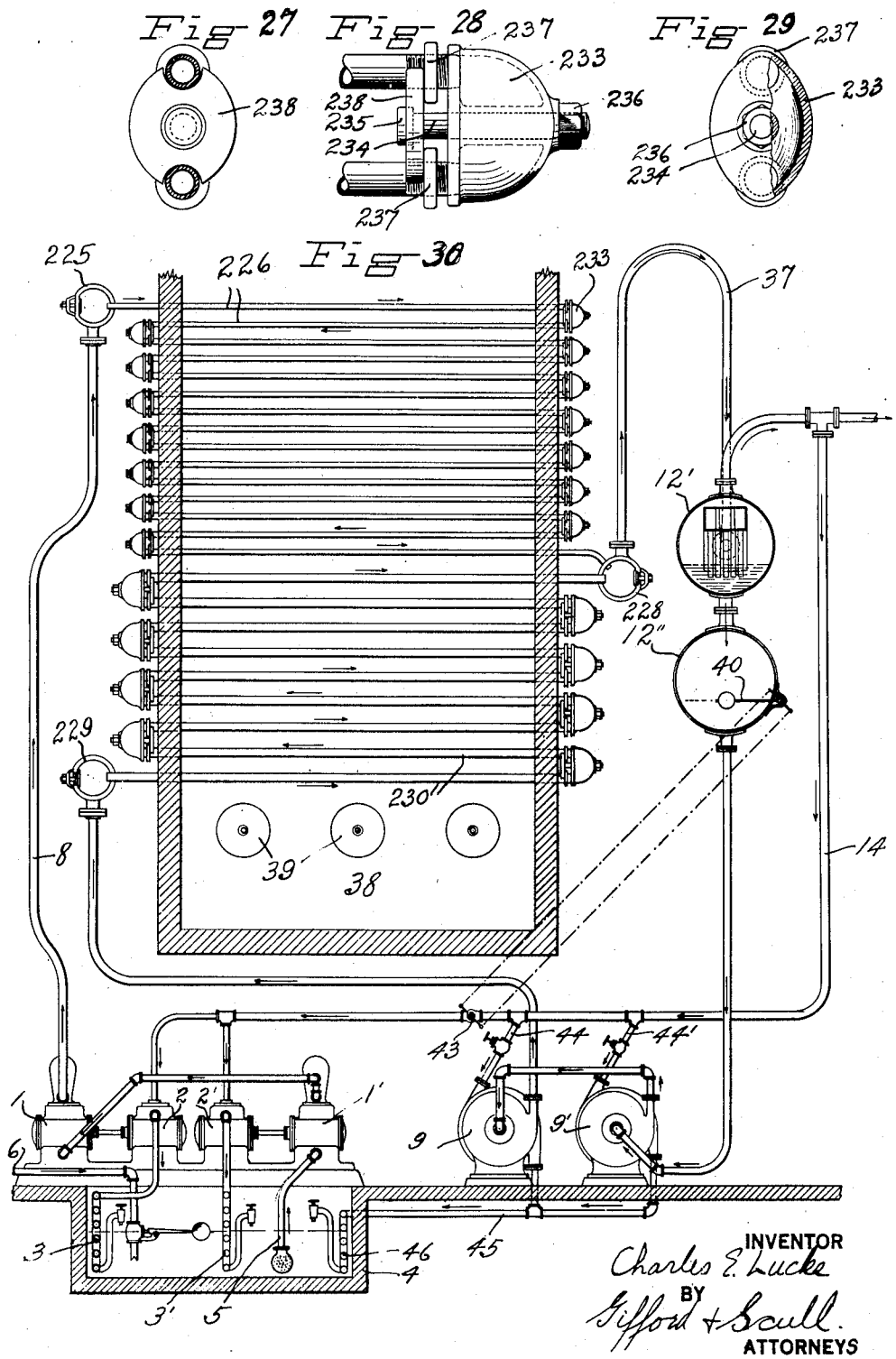

Oct. 27, 1931.  C. E. LUCKE  1,828,870
DOUBLE CIRCUIT FORCED CIRCULATION WATER TUBE BOILER
Filed Jan. 3, 1927  13 Sheets-Sheet 13
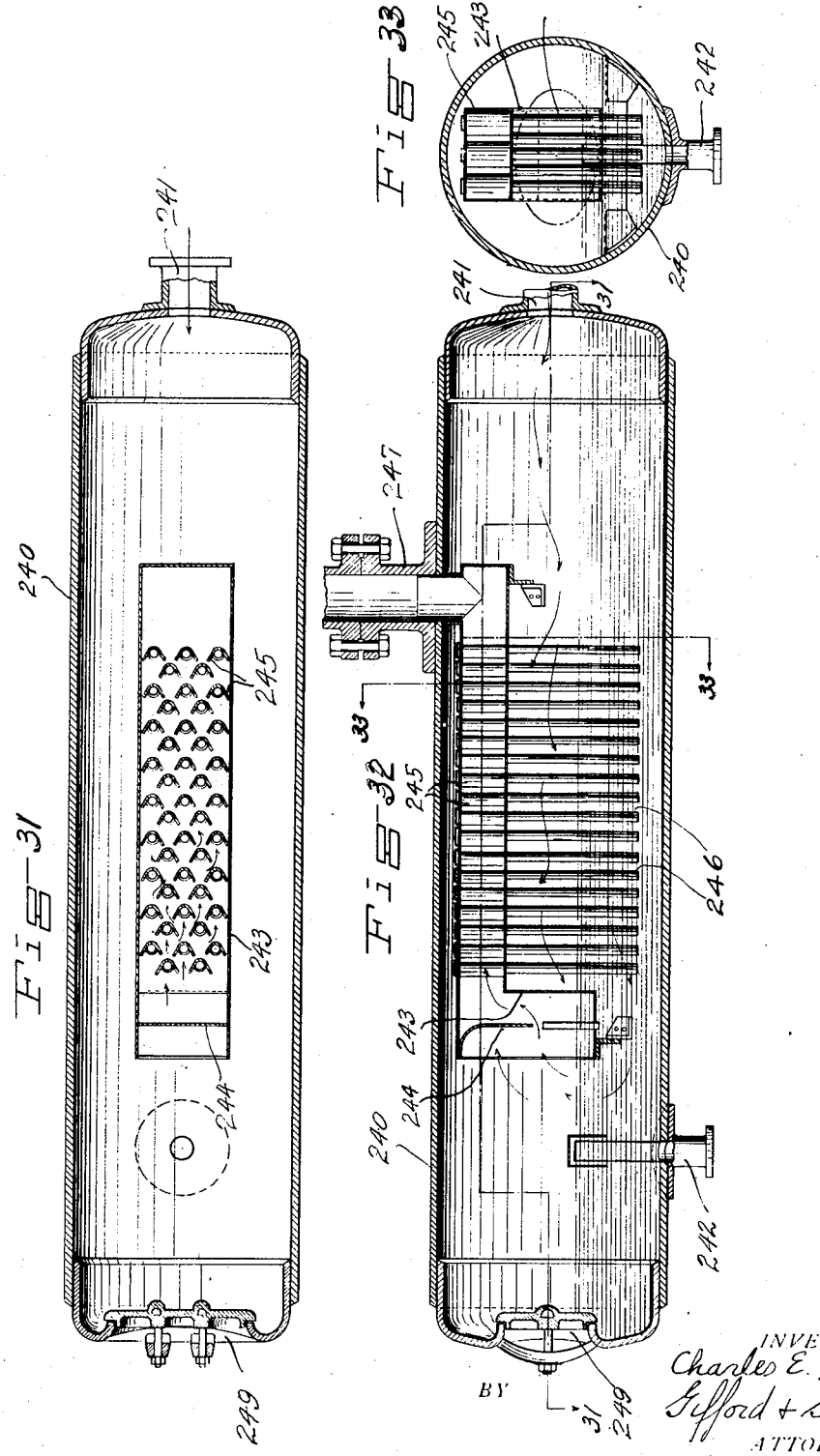

Patented Oct. 27, 1931

1,828,870

UNITED STATES PATENT OFFICE

CHARLES E. LUCKE, OF NEW YORK, N. Y., ASSIGNOR TO THE BABCOCK & WILCOX COMPANY, OF BAYONNE, NEW JERSEY, A CORPORATION OF NEW JERSEY

DOUBLE CIRCUIT FORCED CIRCULATION WATER TUBE BOILER

Application filed January 3, 1927. Serial No. 158,469.

This invention relates to steam boilers in which there is a feed pump for feeding water to the boiler with a separate pump for circulating water in excess through tubes, and so arranged that the rate of circulation is independent of the rate of feed. The rate of feed of water by means of the feed pump to replace steam produced is regulated by the water level in a steam and water chamber which may be a steam and water separator, and the rate of circulation of water through the tubes is independent of the rate of steam generation or the rate at which the water is fed to the boiler by the feed pump, and is fixed wholly by the independent circulating pump.

The invention will be understood from the description in connection with the accompanying drawings, in which Fig. 1 is a vertical section, showing an illustrative embodiment of the invention; Fig. 2 is a section along the line 2—2 of Fig. 1; Fig. 3 is a view similar to Fig. 1 showing a modification; Figs. 4 and 5 are plan and sectional views, respectively, of a tube connector; Fig. 6 is a modification of the pump arrangement; Fig. 7 is a vertical section through the steam and water separator; Fig. 8 is a section through a metering device; Fig. 9 is a view similar to Fig. 1 showing another modification; Fig. 10 is a section along the line 10—10 of Fig. 9; Figs. 11 and 12 are plan and side views of a tube coil arrangement; Fig. 13 is a view similar to Fig. 1 showing another modification; Figs. 14 to 17 are sectional views showing modifications of tube connectors; Figs. 18 and 19 are vertical sections showing other modifications; Fig. 20 is a longitudinal section through a steam and water separator; Fig. 21 is a section along the line 21—21 of Fig. 20; Fig. 22 is a vertical section showing another modification of a steam and water separator; Fig. 23 is a section along the line 23—23 of Fig. 22; Fig. 24 is a view similar to Fig. 1 showing another modification of the invention; Figs. 25 and 26 are sectional and end views showing another modification of tube connector; Figs. 27, 28 and 29 are end, side and partly sectional views showing another modification of tube connector; Fig. 30 is a view similar to Fig. 1 showing another modification; Figs. 31 and 32 are longitudinal sections through another modification of a steam and water separator; and Fig. 33 is a section along the line 33—33 of Fig. 32.

In the illustrative embodiment of the invention shown in Figs. 1 and 2, reference character 1 indicates the water cylinder of a steam pump for feed water, and 2 indicates the steam cylinder of the same. The exhaust from the steam cylinder 2 goes through a coil 3 in a feed water tank 4, into which the condensate from the steam is collected. A suction pipe 5 leads from the tank 4 to the water cylinder 1 of the pump, and the water tank is provided with a pipe 6 leading from any convenient source of water supply, this pipe having a float valve 7 for controlling the level of the water in the water tank. A feed water pipe 8 leads from the pump cylinder 1 to the boiler. A separate pump for circulating unvaporized water that has passed through the water tubes of the boiler is provided, which has a steam cylinder 9 and a water cylinder 10, the water cylinder receiving water through the pipe 11 from the separator 12. A pipe 13 leads from the cylinder 10 to tubes of the boiler through which water is to be circulated. A steam pipe 14 leads from the steam and water separator 12.

The feed water passes from the pipe 8 into a distributor 15 located on one side of the flue, through which the hot gases from the furnace pass. The water then passes into headers 16 that are connected to the distributor 15 and extend across the bottom of the flue, thence through upwardly inclined rows of tubes 17 extending from the headers 16 to headers 18, that are connected to a collector 19 outside the flue extending horizontally along the furnace at the top of the boiler. The water passes from the collector 19 downwardly through the row of tubes 20 to the header 21 and thence into the collector 22.

Water that is circulated by the circulating pump passes through the pipe 13 into headers 23 and 24 at the sides of the furnace from which headers rows of tubes 25 and 26 lead along the furnace walls to cross headers 27 and 28 that are connected to a collector 29 at the top of the boiler on the outside of the furnace. The water passes from the collector 29 into cross headers 30, thence passes downwardly through vertically inclined tubes 31 into cross headers 32, from which it passes into collectors 22, thence through pipe 33 into the drum 34. A pipe 37 leads from the bottom of the drum to the separator 12. The tubes 31 are located in the upper portion of the furnace 38, which may be fired by means of fuel burners 39.

The separator is provided with a float 40 connected to a lever 41 on the outside of the separator. The ends of the lever 41 are connected by a cord or chain 42 to the stem of a valve 43 located in the steam supply pipe 14 for the steam cylinder 2 of the feed pump, so that the feed pump is controlled by the level of the water in the separator 12. A pipe 44 in which a hand controlled valve is located leads from the steam pipe 14 to the steam cylinder 9 of the circulating pump and an exhaust pipe 45 leads from this cylinder to a coil 46 in the feed water tank 4 where the exhaust steam from the circulating pump is condensed.

In the modification shown in Fig. 3, the feed water pipe 8 from the water cylinder 1 of the feed water pump passes through a jacket 50 through which the pipe 11 from the separator 12 passes, so that the feed water is heated to some extent before it enters the header 51. The feed water passes from the header 51 through rows of tubes 52 across the hot gas passage into tube connectors 53, from which it passes to a row of U-tubes 54, connecting the tube connectors 53 to the next lower set of connectors 53, and so on, to the lowest set of connectors of the series 53, thence through a row of tubes 55 to the collector 56, from which the pipe 37 leads to the steam and water separator 12.

Circulating water passes from the separator 12 through the pipe 11 and is cooled by the feed water, so that steam will not be formed when the pressure is released as it passes a metering orifice 57 on the way to the suction tank 58 of the circulating pump. The float mechanism 59 is provided in this tank and a lever on it is connected by cords 61 to a lever on the stem of the valve 62 in the pipe 44 leading to the steam cylinder of the circulating pump.

Circulating water from the cylinder 10 of the circulating pump passes through branch pipes from the pipe 13 to the headers 64, 65 and 66, respectively. The water passes from the header 66 through the row 67 of furnace wall tubes to the header 68. Water passes from the header 65 through the row 69 of furnace wall tubes to the header 70. A pipe or pipes 70' lead the steam and water from the headers 68 and 70 to the header 56. Water passes from the header 64 through the row of U-tubes 71, extending across the path of hot furnace gases from the furnace to the tube connectors 72, thence from the rows of U-tubes to the row of tubes 73 leading to the collector 74 from which a pipe 75 leads to the steam and water separator 12.

In this modification the safety valve 35 is connected to the steam pipe 14 from the steam space of the steam and water separator 12 and the pipe 36 leads from the steam pipe 14 to the steam main.

The rate at which water is circulated through the tubes in this modification is the rate of bleeding through the permanently or adjustable fixed orifice 57, and the circulatory pump speed is adjusted automatically to accomplish this by the float actuated steam valve which keeps a constant level in the suction tank 58 of the circulatory pump. For any given bleeder orifice or setting of the same, the rate of circulation of water is substantially constant and wholly independent of the rate of feed or of steam generation.

One of the tube connectors 53 is shown in detail in Figs. 4 and 5. It consists of a box 77 having threaded pieces 78 that are connected by means of the internally threaded sleeves 79 to the threaded ends of the tubes 54. Handholes 80 are provided in the box 77 opposite the tube openings.

A vertical section through a steam and water separator, such as is shown at 12 in Figs. 1 and 3, is illustrated in Fig. 7. The mixture of steam and water enters the top at 81 and strikes the upper portion of the cap 82, the steam passing to the right through the passage 83 as indicated by the arrows, while the water passes through the pipe 84 and thence through the pipe 85 to the bottom of the separator. The steam passing through the passage 83 also strikes the baffles 86 and water thereby separates, trickles down the surface 87 and enters the pipe 85, while steam separated from the water in the space 88 passes upwardly and outwardly through the passage 89 to the steam outlet 90 that is connected to the steam pipe 14 (Figs. 1 and 3). The outlet 91 is connected to the circulating water pipe 11.

In the modification shown in Fig. 6 unvaporized water passes from the steam and water separator 12 through the pipe 11 and orifice 57 to the closed suction tank 93 of the circulating pump, this tank being vented by pipe 94 to the steam pipe 14, so that the flow of liquid is free. A constant level is maintained in this suction tank 93 by a float mechanism 95 which controls the steam valve 96 of the circulating pump. By this arrangement the head of water on the orifice which determines the rate of circulation and makes it independent of feed is the difference in level between the separator water and that in the suction tank 93 of the circulating pump. This makes it practicable to do without the heat exchanger 50, shown in Fig. 3, as little or no steam is formed and this little does not leave the system. Furthermore, a larger orifice may be used and less power is required to work the circulating pump because full steam pressure acts on its suction. A metering device is shown in detail in Fig. 8, in which different discs 57', having orifices of different sizes, may be used to suit different conditions.

In the modification shown in Figs. 9 and 10, the feed water pipe 8 leads to a vertical header 100 from which it passes through U-shaped tubes 101 in parallel extending across the flue into the next vertical header, and so on, passing through the nipples at the tops of the headers 100 into cross headers 102, thence through nipples into the upper ends of the headers 103 on the other side of the flue, thence through U-tubes 104 in parallel in the flue, and finally from the upper end of the last header 103 through the pipe 105 to the drum 34. The pipe 37 leads from the drum 34 to the steam and water separator 12.

Circulating water passes in part from the pipe 13 to the header 106, thence through a row of inclined tubes 107 along the lower portion of the furnace to the header 108, thence through the pipe 109 to header 110, thence through an inclined row of tubes 111 to a header 112, thence through a tube coil 113 along the inner walls of the furnace, and finally through the pipe 114 to the separator 12. The other portion of the circulating water passes through the pipe 13, through the connection 115 to the tube coil 116 to the first compartment of a vertically disposed distributing header 117 that has partitions therein, through tube 118 into a compartment of a similar header on the other side of the flue, thence through the next higher tube 118 and so on through connection 119 to the tubes 119' that are connected in series, thence through connection 120 into the first header 121, through U-tubes 122 extending into the furnace, and thence into the adjacent headers 121 and finally through the connection 123 to the drum 34.

The furnace coil tubes 113 and 116 are shown more clearly in Figs. 11 and 12 as being made up of straight portions 124 connected by nipples 125 and 126 at opposite sides of the furnace wall.

In the modification shown in Fig. 13 feed water passes from the pipe 8 into a header 130, from which it passes through wall tubes 131 into the connectors 132 inside of the steam and water drum 133 from which it passes through U-tubes 134 extending across the flue into the next connector, and so on until it enters the steam and water drum 133 from the outlet end of the last set of U-tubes 134. The drum 133 is provided with a safety valve 35 and a pipe 36 leads from the top of this drum to the steam main. A mixture of steam and water passes from the lower portion of the drum 133 through the pipe 37 to the steam and water separator 12.

The circulating water passes from the pipe 13 to the header 136 from which header a portion of the water passes upwardly along the inside of the furnace through the row of tubes 137 to the header 138, thence through connection 139 to the drum 133. Another portion of the circulating water passes from the header 136 through the nipples 140 to the headers 141 located upon opposite sides of the furnace, from which headers 141 the water passes upwardly through side wall furnace tubes 142 and into headers 143 and from thence through a similar set of furnace wall tubes 144 to the headers 145 from which the mixture of steam and water passes through connection 146 to the header 138.

A drum similar to the drum 133 (Fig. 13) with the tube connectors is shown more clearly in Figs. 14, 15 and 16, in which the tube connectors 147 are shown as being made up of hollow members with curved edges 148 that fit against the inside surface of the drum and of sufficient length circumferentially of the drum to connect the ends of two U-tubes. The tube connectors 147 are provided with recesses 149 into which the ends of the bolts 150, extending through the ring 151, are seated. The ring 151 is adjustable by means of the bolt 152 that bears against the inside of the drum 133. In the modification shown in Fig. 15, the tube connector 153 is longer in the longitudinal direction of the drum, so that the ends of two rows of tubes are connected by each connector 153 and a plurality of recesses 154 are provided into which the ends of a plurality of bolts may extend to keep the connectors in place. In the modification shown in Fig. 17, the connectors 155 are kept in place against the inside surface of the drum 133 by means of bolts 156 and cross pieces 157 that rest against the connectors 155.

In the modification shown in Fig. 18 a boiler of the Stirling type is shown. The feed water passes from the pipe 8 to a header 160 from which it passes through rows of tubes 161 to the header 162, thence downwardly through rows of tubes 163 to the header 164, thence upwardly through the tubes 165 to the header 166 from which it passes through the pipe 167 to the drum 168 that is provided with a partition 169 that divides it into two parts. It then passes downwardly through the tubes 170 to the connector 171 inside the drum 172 that is provided with a partition 173 dividing the drum into two parts, thence through connection 174 to the tube 37 which leads to the steam and water separator 12.

Circulating water from the pipe 13 divides into two branches, a part going into the left hand side of the drum 172, thence upwardly through tubes 175 to the right hand side of drum 168, thence through tubes 176 to the left hand side of the drum 177 that is divided into two parts by means of the partition 178, thence downwardly through the tubes 179 to the right hand side of the drum 172, thence upwardly through the tubes 180 to the right hand side of drum 177, thence through connection 181 to the steam and water separator 12. The other portion of the circulating water goes from the pipe 13 through the pipe 182 to the drum 183, thence upwardly through the furnace wall tubes 184 to the right hand side of the drum 177, thence to the steam and water separator 12.

In this modification the furnace is shown as fired by a chain grate stoker 185.

In the modification shown in Fig. 19, feed water passes from the pipe 8 into the drum 190, thence along the furnace wall through wall cooling tubes 191 and also through the tubes 192 to the drum 193 that is provided with a safety valve 35 and a pipe 36 leading to the steam main. A baffle 193' may extend longitudinally of this drum to prevent water from entering the steam main.

The circulating water from the pipe 13 divides into two branches, part going to the drum 194, thence through tubes 195 to the drum 193. The other part of the circulating water passes into the header 196, thence through furnace wall cooling tubes 197 to the drum 193. A pipe 37 leads from the drum 193 into the steam and water separator 12 and a branch pipe 198 leads from the steam pipe 14 to the steam outlet 36 from the drum 193.

A steam and water separator is shown in Figs. 20 and 21 in the form of a horizontal drum 200 into the upper side of which rows of tubes 201 for introducing a mixture of steam and water enter. A steam outlet 202 is provided at the upper side of the drum and a water outlet 203 at the lower side thereof. Troughs with sides 204 and 205 are located in the drum, so that water draining into the lower portion will pass out through the short pipes 206 into the water in the lower portion of the drum that is retained therein because the upper end of the water outlet pipe 203 extends above the lower side of the drum. The steam passes around above the flanges 205, thence into the steam outlet 202, as indicated by the arrows. The drum 200 is provided with a fitting 207 at the end thereof.

The steam and water separator 12 indicated somewhat diagrammatically in Fig. 19, is shown more in detail in Figs. 22 and 23. In this modification, the separator comprises a vertical drum 210 having a connection 211 for the pipe 37, introducing a mixture of steam and water, and a connection 212 for the outlet pipe 11 for water. The mixture of steam and water entering the inlet 211 enters the annular space around the baffle 213 that is semicircular in cross section and has its upper edge flanged and fitting tightly along the inner surface of the drum 210, while its lower edge is slightly spaced from the inner surface of the drum to cause the mixture of steam and water to pass as a film downwardly along the inside of the drum to the baffle 214, the steam passing through the opening 215 and the water passing through the pipes 216 into the next baffle 217, where more separation of steam and water takes place, the water passing downwardly through the tubes 218 to the lower portion of the drum 210, into the water so that the lower ends of these tubes are sealed. The steam that is separated from the water finally passes upwardly through the central pipe 219 that is connected to the steam pipe 14 (Fig. 19). The drum 210 is provided at its lower end with a fitting 220 and with a drain pipe 221.

In the modification shown in Fig. 24, a separator 12' and a collector 12'' are shown. In this modification two feed pumps are shown in parallel, one being designated by the same reference characters as heretofore used, and the other with corresponding reference characters with primes. Two circulating pumps are also shown in parallel, these pumps being illustrative of the centrifugal type that circulates the unevaporated water that collects in the collector 12''. The two feed pumps and two circulating pumps are connected in parallel to operate as spares to better control the volume of water in relation to flow resistance. The centrifugal circulating pumps are driven by steam turbines and the feed pumps could also be of this type. The controls of both sets of pumps are similar to that shown in Fig. 1 and the circulation rate is independent of feed or steam generation. In this modification, feed water from the pipe 8 enters the drum 225, thence passes through a row of U-tubes 226 extending across the hot gas passage into connectors 227 on the outside of the hot gas passage, thence through successive rows of tubes and connectors to the drum 228, thence through pipe 37 to the steam and water separator 12', from the steam space of which a pipe leads to the steam main. The water space of the separator 12' is connected to the collector 12''. A float mechanism 40 in the collector 12'' regulates a valve 43 in the steam line to the feed pumps. The circulating water passes through the pipe 13 to the header 229, thence through rows of U-tubes 230 extending across the hot gas passage to the connector 231, thence through rows of U-tubes and connectors to the drum 228.

The connectors 227 are shown in detail in Figs. 25 and 26 as being made up of somewhat rectangularly shaped boxes with holes for the tubes 226 on one side and corresponding fittings 232 on the opposite side.

Another modification of tube connector is shown in Figs. 27, 28 and 29, in which the tube connector 233 is oval shaped with one face flat. The ends of the tubes are tapered and seated into tapered holes in the flat face and a rod 234 with a head 235 at one end and a nut 236 at the other end extends through a passage through the connector. Rings 237 are threaded upon the tubes near the ends thereof and a cross piece 238 extends between the tubes and rests against the rings 237. The rod 234 extends through a hole in the cross piece, so that the nut 236 may be tightened to keep the connector 233 securely in place.

In the modification shown in Fig. 30, two feed pumps and two circulating pumps are shown, the water ends of each pair being connected in series to divide the rise of pressure between them, but they are otherwise controlled as in Fig. 24 and are designated by the same reference characters. The tube coils and connections in this modification are similar to those in Fig. 24, except that the tube connectors shown in Figs. 27, 28 and 29 are used for connecting the ends of the tubes that extend across the hot gas passage and straight tubes instead of U-tubes are used.

The modification of steam and water separator for Figs. 24 and 30 is shown in detail in Figs. 31 to 33. The mixture of steam and water enters the drum 240 through the inlet 241, the water separating and passing to the bottom and through the sealed outlet 242, the inner end of which extends above the bottom of the drum. The steam with entrained water passes under and along the sides of the box 243 and enters the end of the box 243 and passes the baffle 244, hence by the baffles 245 that extend in a vertical direction between the upper and lower sides of the box 243. The baffles 245 are made by slitting a tube and spreading the slit edges apart, the lower ends of these tubes extending through holes in the lower side of the box 243 to provide tubes 246 that extend into the water in the steam and water separator. The steam outlet 247 leads to the steam main. The drum may be provided with a fitting 249 at one end thereof.

It is to be understood that the various steam and water separators and tube connectors and arrangements of tube coils may be used in the different modifications, some of the same having been illustrated in one modification of the invention, and some in another.

I claim:

1. A steam generating system having in combination a boiler furnace, steam generating wall tubes spirally arranged within said furnace so as to enclose the combustion chamber thereof, steam generating wall tubes spirally arranged so as to enclose the outlet flue, a circulating pump for forcing water into each group of said tubes, a separate connection from said pump to each group of said tubes, an economizer section, a steam and water collector for receiving steam and water from said second group and water from said economizer, a feed pump for forcing water through said economizer into said collector, a steam and water separating chamber connected to said first group and to said collector, and a connection for supplying said circulating pump with water from said separating chamber.

2. A steam generating system having in combination a boiler furnace, a group of economizer tubes located so as to be subjected to the outgoing gases from said furnace and proportioned to generate some steam, a feed pump forcing water through said economizer tubes, separate groups of steam generating tubes located in said furnace and arranged so as to provide separate paths of flow therethrough, a circulating pump forcing water through said groups of tubes, a steam and water separator receiving the discharge from each of said groups of tubes above the water in the separator, a connection for supplying said circulating pump with water from said separator, and means for regulating the operation of said feed pump by the water level in said separator.

3. A steam generating system having in combination a boiler furnace, steam generating horizontal wall tubes serially connected and arranged within said furnace so as to enclose the combustion chamber thereof, a second group of steam generating horizontal wall tubes serially connected and arranged so as to enclose the outlet flue, a circulating pump for forcing water into each of said groups of tubes, a separate connection from said pump to each of said groups of tubes, an economizer section, a separator for receiving steam and water from said second group of tubes and water from said economizer, a feed pump for forcing water through said economizer into said separator, a connection from said first group of tubes to said separator, a connection for supplying said circulating pump with water from said separator, means to deliver operating steam to each of said pumps from said separator, and means for mixing the exhaust from said pumps with incoming feed water.

4. A steam generating system having in combination a boiler furnace, a group of steam generating horizontal wall tubes serially connected and arranged within said furnace so as to enclose the combustion chamber thereof, a second group of steam generating horizontal wall tubes serially connected and arranged so as to enclose the outlet flue, a circulating pump for forcing water into each of said groups of tubes, a separate connection from said pump to each of said groups of tubes, an economizer section, a separator receiving steam and water from said second group of tubes and water from said economizer, a feed pump for forcing water through said economizer, a connection between the first group of tubes and the separator, and a connection for supplying said circulating pump with water from said separator.

5. A steam generating system having in combination a boiler furnace, economizer tubes, a feed pump for forcing water through said economizer, steam generating tubes, a centrifugal circulating pump for maintaining circulation through said steam generating tubes independent of said feed pump, a steam and water separator for receiving fluid from said economizer and from said steam generating tubes, and regulating means associated with said separator and arranged to maintain a substantial head of water over the inlet to said centrifugal circulating pump, and a connection for delivering water to said circulating pump from said separator.

6. A steam generating system having in combination a boiler furnace, economizer tubes, a feed pump for forcing water through said economizer tubes, a steam generating tubes. a circulating pump for maintaining circulation through said steam generating tubes independent of said feed pump, a steam and water separator for receiving fluid from said economizer and from said steam generating tubes, and regulating means for said feed pump and controlled by the water in the system to replace the water evaporated and maintain a substantial head of water over the inlet to said circulating pump, and a connection for delivering water to said circulating pump from said separator.

7. A steam generating system having in combination, a boiler furnace, economizer tubes, a feed pump forcing water through said economizer tubes, steam generating tubes, a circulating pump for maintaining circulation through said steam generating tubes independent of said feed pump, a steam and water separator for receiving fluid from said economizer and from said steam generating tubes, and means proportioning the rate of feed by the feed pump to the water evaporated in the generator to replace the water evaporated and maintain a substantial head of water over the inlet to said pump, and a connection delivering water to said circulating pump from said separator.

CHARLES E. LUCKE.

CERTIFICATE OF CORRECTION.

Patent No. 1,828,870.                                     Granted October 27, 1931, to

CHARLES E. LUCKE.

It is hereby certified that error appears in the printed specification of the above numbered patent requiring correction as follows: Page 5, lines 58 and 61, claim 1, for the word "spirally" read sinuously; page 6, line 24, claim 6, strike out the article "a"; and that the said Letters Patent should be read with these corrections therein that the same may conform to the record of the case in the Patent Office.

Signed and sealed this 8th day of December, A. D. 1931.

(Seal)                                                                 M. J. Moore,
                                                                      Acting Commissioner of Patents.